UNITED STATES PATENT OFFICE.

WILLIAM RALPH DODD, OF LONDON, ENGLAND.

PREPARING FOOD FOR INFANTS.

SPECIFICATION forming part of Letters Patent No. 620,645, dated March 7, 1899.

Application filed November 5, 1897. Serial No. 657,483. (No specimens.)

*To all whom it may concern:*

Be it known that I, WILLIAM RALPH DODD, pharmaceutical chemist, of Dunsmure road, Stamford Hill, in the city of London, England, have invented certain new and useful Improvements in the Preparation of Food Suitable for Infants, of which the following is a specification, and for which a patent has been obtained in Great Britain, No. 21,632, dated December 10, 1891.

In the specifiation of my United States Letters Patent No. 612,561, dated October 18, 1898, I have fully set forth the method of manufacturing a suitable food for infants of very tender age, and the food prepared in accordance with this specification is so devised as to be well adapted to succeed the one above referred to when the infant has sufficiently developed to require a stronger and more sustaining form of diet.

As infants progress in age it is desirable to offer them a food which in addition to supplying their immediate wants in respect of nutrition may stimulate the various digestive functions, so as to duly bring them into efficient action. Starch, the preponderating constituent of farinaceous foods, is ill suited to afford the stimulus in question, as it is itself found in the case of young infants to be incapable of assimilation and to pass through the system practically unchanged.

A suitable stimulus to the exercise of digestive functions may be obtained by submitting for food a material such as dextrin, which in itself would appear to be not directly assimilable, but has to be broken down or degraded (by the abstraction therefrom of one or more molecules of water of constitution) into maltose, which is capable of direct assimilation in the stomach. This chemical degradation (or abstraction of the molecules of water) can be effected by the secreted fluids of the digestive organs, and it is therefore desirable to administer as a food a certain proportion of dextrin with a view to the exercise of this action.

When starch previously gelatinized is suitably acted upon by diastase in the presence of water, it is wholly converted into dextrin and maltose together with chemical combinations of the two bodies, which combinations are known as "malto-dextrins." It has been found that the ratio of maltose to dextrin will vary with the temperature at which this starch conversion is effected, and it has further been found that by digesting the starch diastase and water at a temperature of about 160° Fahrenheit the resulting product will contain about sixty-six per cent. of maltose and about thirty-four per cent. of dextrin and that the results yielded at this temperature are more stable in composition than those of intermediate temperatures. This temperature—viz., 160° Fahrenheit—is that which I employ in the preparation of this food.

Barley-malt as ordinarily prepared contains more diastase than is sufficient to convert the whole of its contained starch into maltose and dextrin, and I therefore utilize this excess by the addition of a sufficiency of unmalted starch. This starch I prefer to introduce in the form of wheat because of the phosphates this cereal contains, and I so arrange my proportion of added wheat-starch to malt with respect to the diastatic power of malt (if necessary previously ascertained) that after proper digestion with water at a temperature of 160° Fahrenheit no free starch is left in the mixture. The added starch, whether wheat-starch or derived from other sources, is previously gelatinized by methods well known and utilized for other purposes of manufacture.

In the preparation of this food I proceed as follows: Ten pounds avoirdupois of crushed wheat are boiled with water for, say, one hour, (or longer, if necessary, to gelatinize it fully,) and the resulting gelatinized mixture is then cooled down to 160° Fahrenheit. There is next added to it ten pounds, avoirdupois, of good crushed malt, preferably of high diastatic power. All the ingredients are well mixed together and allowed to digest, the temperature being maintained at about 150° Fahrenheit for about two hours or until such time as chemical examination shows that the whole of the starch has been converted. The resulting mash is then allowed to settle and the clear supernatant fluid carefully removed. The latter is next neutralized with a sufficiency of carbonate or bicarbonate of sodium or of lime-water, (hydrate of lime.) To the fluid resulting from the mashing above described, I add one hundred pounds cow's milk, sterilized, or one hundred pounds of cow's milk treated in the manner described in my hereinbefore-mentioned Letters Patent to remove a portion of its casein, but not evaporated to a pasty consistency and without the addition of albumen (wheat extract, &c.) or lactose, or I take the food resulting from the use of one hundred pounds cow's milk by the process described in my said Letters Patent before being subjected to evaporation. The second of these processes I prefer. The resulting mixture I neutralize, if necessary, and then evaporate down in a vacuum-pan until the mixture weighs about twenty-five pounds to thirty pounds avoirdupois. I have given these proportions as representing those which I find in practice give the best results; but it must be understood that I do not bind myself absolutely to these figures. After evaporation the food is ready for packing in tins or other convenient vessels capable of being hermetically sealed. Before being administered as food the product manufactured as above described should be diluted in the proportion of about one part of food to three of warm water. If desired, cane-sugar to the extent of about two per cent. in the finished product may be added as a sweetening ingredient.

I claim—

The within-described process of preparing a food for infants consisting in digesting in water at a temperature of about 160° Fahrenheit a mixture of crushed malt and previously-gelatinized wheat-starch, allowing the digested mixture to settle and removing the clear liquor therefrom, adding milk to said liquor, and finally evaporating *in vacuo* the mixture of said liquor and milk, substantially as herein described.

W. RALPH DODD.

Witnesses:
ALFRED V. BISHOP,
H. E. NEWTON.